United States Patent [19]
Priest et al.

[11] Patent Number: 6,047,160
[45] Date of Patent: Apr. 4, 2000

[54] TRANSPORTABLE BASE STATION FOR A TRUNKED RADIO COMMUNICATION SYSTEM

[75] Inventors: Mark D. Priest, Rustburg; Peter M. Mangum; Steven T. Dreon, both of Forest, all of Va.

[73] Assignee: Ericsson Inc., Research Triangle Park, N.C.

[21] Appl. No.: 08/705,553

[22] Filed: Aug. 29, 1996

[51] Int. Cl.[7] .................................................... H04Q 7/28
[52] U.S. Cl. ........................ 455/11.1; 455/454; 455/524; 455/561; 455/62
[58] Field of Search .................................. 455/422, 450, 455/451, 452, 454, 455, 462, 507, 509, 516, 524, 62, 63, 67.1, 561, 575, 11.1, 520

[56] References Cited

U.S. PATENT DOCUMENTS

| | | |
|---|---|---|
| 3,955,140 | 5/1976 | Stephens et al. . |
| 4,056,779 | 11/1977 | Toler . |
| 4,056,780 | 11/1977 | Faulkner . |
| 4,150,334 | 4/1979 | Williams . |
| 4,152,647 | 5/1979 | Gladden et al. . |
| 4,383,332 | 5/1983 | Glance et al. . |
| 4,539,706 | 9/1985 | Mears et al. . |
| 4,553,262 | 11/1985 | Coe . |
| 4,771,448 | 9/1988 | Koohgoli et al. . |
| 4,905,302 | 2/1990 | Childress et al. . |
| 4,939,746 | 7/1990 | Childress . |
| 4,965,787 | 10/1990 | Almond et al. . |
| 5,010,583 | 4/1991 | Parken . |
| 5,056,152 | 10/1991 | Truby et al. . |
| 5,175,866 | 12/1992 | Childress et al. . |
| 5,276,686 | 1/1994 | Ito . |
| 5,408,680 | 4/1995 | Hattey et al. . |
| 5,425,030 | 6/1995 | Comroe et al. ..................... 455/520 X |
| 5,428,817 | 6/1995 | Yahagi . |
| 5,430,789 | 7/1995 | Ohgami . |
| 5,475,734 | 12/1995 | McDonald et al. . |
| 5,487,185 | 1/1996 | Halonen . |
| 5,519,761 | 5/1996 | Gilhousen .......................... 455/11.1 X |
| 5,533,029 | 7/1996 | Gardner . |
| 5,548,809 | 8/1996 | Lemson ................................. 455/454 |

FOREIGN PATENT DOCUMENTS

94/28684   12/1994   WIPO .

Primary Examiner—Wellington Chin
Assistant Examiner—Philip J. Sobutka
Attorney, Agent, or Firm—Burns, Doane, Swecker & Mathis, L.L.P.

[57] ABSTRACT

A base station is configured to facilitate its rapid deployment to provide trunked radio communication system. The base station includes a receiving section and a transmitting section functioning as a repeater operating on a single trunked duplex channel. The base station also includes another receiving section for interrogating the presence of pre-existing RF energy in a given geographic area before allowing the base station to become active. This prevents a newly introduced deployable base station from interfering with pre-existing deployable or fixed base stations.

13 Claims, 11 Drawing Sheets

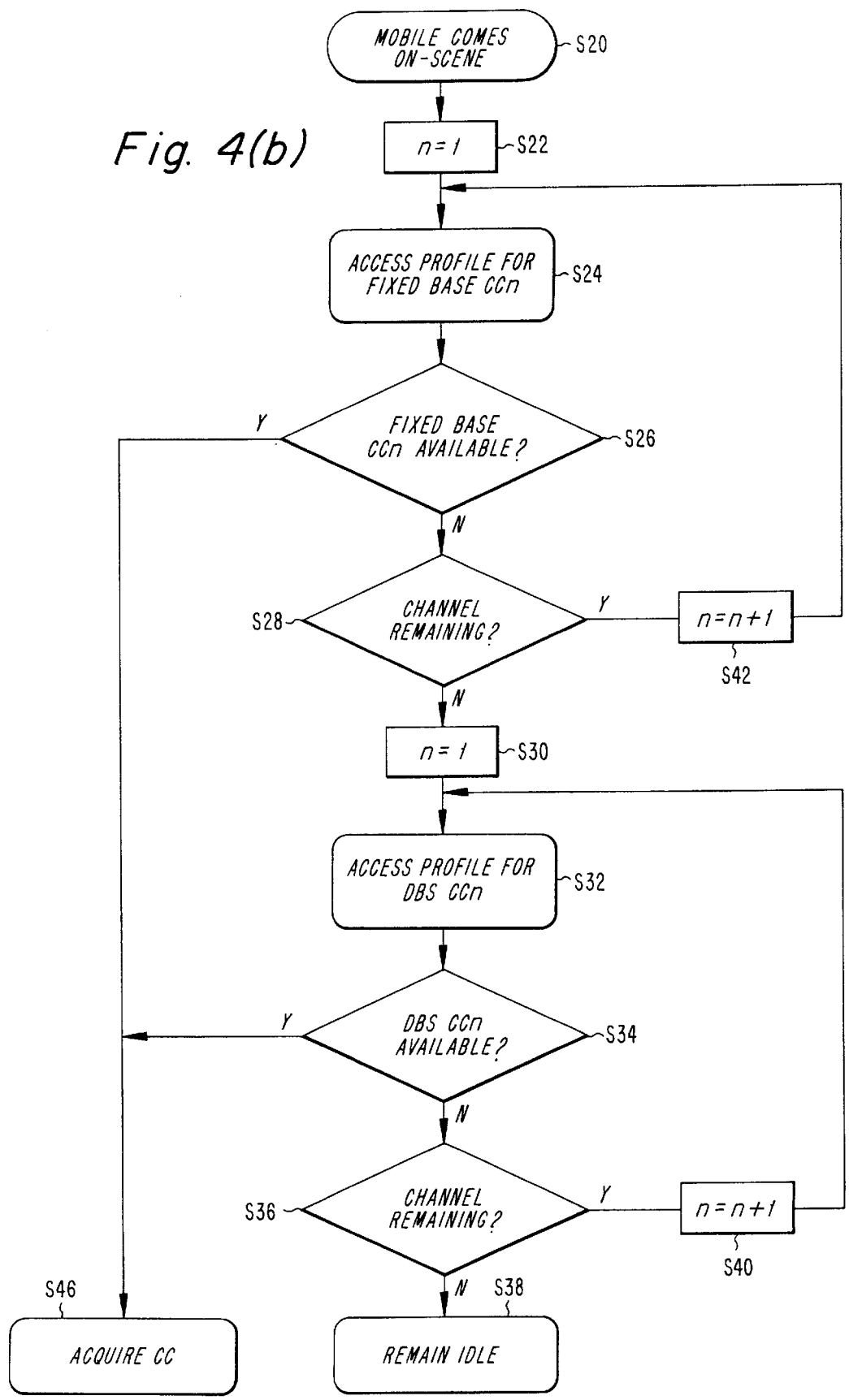

TRANSPORTABLE BASE STATION FOR A TRUNKED RADIO COMMUNICATION SYSTEM

BACKGROUND

The present invention relates generally to a base station which may be moved from one location to another to meet changing geographic demands for trunked radio communication service.

Users in a trunked radio communication system typically share a prescribed number of communication channels. Access to the channels is coordinated by a central trunking processor, usually located within a fixed base station.

An exemplary fixed base station 98 is illustrated in FIG. 1. The base station 98 comprises a transmitting antenna 100 connected to a transmitting combiner 102 and a receiving antenna 106 connected to a receiving multicoupler 104. The transmitting combiner 102 and receiving multicoupler 104 service a plurality of RF duplex repeater modules, one of which is denoted by 108. Each repeater module is serviced by a microprocessor based control circuit 110 (referred to as a "control shelf" or CS), in association with another microprocessor based control circuit 112 (referred to as a "trunking card" or TC). The plurality of trunking cards are connected through bidirectional link to a primary site controller 114. The primary site controller 114, in turn, provides connection to a public service switched telephone network 120, a dispatch console 118, and/or a multisite controller 116. The multisite controller 116 provides access to other fixed base stations 98.

In operation, a channel assignment is initially requested by a calling radio unit which transmits a digital request signal over a digital control channel to the base station 98. The base station 98 ascertains whether a channel is available, and if so, grants the requesting mobile permission to use a working channel by passing channel assignment messages over the digital control channel to the requesting mobile. Upon receiving the assignment messages, the requesting radio tunes its receiver to the proper working channel. Any radio specified in the requesting radio's request message (the "called" radios) will also tune to the proper working channel and unmute their radios. Communication then proceeds between the requesting radio and any other "called" radio on the assigned working channel. During the call, a corresponding repeater module 108 within the base station 98 is allocated to the call.

The use of a digital control channel and associated digital data protocol provides a number of benefits. For instance, the use of a digital data protocol enables a central dispatcher to selectively transmit a message to an individual's mobile radio. The dispatcher may also transmit a message to a predefined group (or fleet) of mobile radios, such that each member within the group simultaneously receives the message. Moreover, in a digital system of the type described, communication security may be provided through the encryption of the digital data messages. A discussion of various special features typically provided in trunked radio communication systems may be found in commonly assigned U.S. Pat. No. 4,905,302 to Childress et al., which is incorporated herein in its entirety.

As one can readily appreciate, a trunked radio communication system of the type described above typically employs an extensive technical and administrative infrastructure. This has limited the application of this technology to certain users which have a projected long-term need for this service and the substantial financial resources to support the service. Governmental agencies are entities which meet this description. Commonly, for instance, a public service trunked (PST) radio service provides service to various employees of a city's fire and police departments. Private entrepreneurs may also provide trunked radio communication at one or more sites within a given geographic area for use by one or more independent business entities using special mobile radios (SMR). But even these applications usually entail a contractual commitment by the private entrepreneur to provide trunked service on a relatively long-term basis.

In contrast, short-term operations (such as disaster relief in remote areas) have not employed traditional trunked radio communication systems because there usually is not sufficient time to install and properly test the system. Other short term events (such as concerts, conventions, sporting events, and festivals) may provide ample time to install the system, but it is rarely economically feasible to do so for such a limited use. Moreover, there may be various administrative hurdles obstructing quick installation of a traditional trunked radio communication system, such as the need to ensure that the fixed range of duplex channels used by the fixed base station do not interfere with any preexisting radio communication service in the area. As a result, system providers have relied on "conventional" (non-trunked) repeaters to provide wireless communication service in these short-term applications, or dedicated communication lines.

However, the use of conventional repeater stations has notable drawbacks. The conventional repeaters typically operate in simple analog mode on a single transmit frequency and a single receive frequency, and could not provide message privacy through data encryption. This is especially a problem when police operations beyond the range of a fixed base station demand security against eavesdroppers. Furthermore, in conventional repeater stations, users can not selectively communicate messages to and from individuals or groups of individuals. It was therefore difficult to exclude extraneous messages, causing confusion among the users—often in crisis situations.

It is therefore an objective of this invention to provide trunked radio communication services for applications which have been traditionally excluded from this service. It is a more specific objective of this invention to provide a base station which may be quickly and economically deployed at a scene to provide trunked radio communication.

SUMMARY

These and other exemplary objectives are achieved according to the present invention through a base station which is configured to facilitate its rapid deployment to provide trunked radio communication service. The base station includes a receiving section and a transmitting section functioning as a repeater operating on a single trunked duplex channel. The single channel operates alternatively in a control channel mode and in an assigned channel mode, with the idle mode being the control channel mode. When the system is idle, control channel signalling is transmitted over the single channel. When a channel request is received, a channel assignment message is sent out via the control channel signalling and the single channel then begins operating as an assigned channel. At the conclusion of the assigned channel communication, the single channel reverts to the control channel mode in readiness for further channel assignments.

According to another exemplary aspect of the present invention, the deployable base station also includes another receiving section for ascertaining the presence of pre-existing RF energy in a given geographic area before allowing the base station to become active. This prevents a newly introduced deployable base station from interfering with pre-existing deployable or fixed base stations.

According to still another exemplary aspect of the present invention, the deployable base station operates in the same communication band allocated to a traditional fixed base station. This enables the same portable units to be used for both the fixed and mobile stations without modification to their hardware. Also, when the coverage provided by a deployable base station overlaps the coverage provided by a stationary base station, the use of the same communication band and compatible trunking protocol allows a portable to easily switch between the two systems.

The reduced hardware requirements of the deployable base station, together with its selective use of non-interfering control channel frequencies, extends the use of trunked radio communication services to short-term applications which heretofore did not technically or economically justify the use of trunked radio communication service. These applications include, but are not limited to, the use of trunked radio communication systems to provide service to disaster relief activities in remote geographic areas, fairs, festivals, concerts, sporting events, conventions, etc. Also, the deployable base station of the present invention can be substituted for a stationary base station in the event that the stationary base station becomes inoperative for some reason (e.g. in the event of natural disasters).

BRIEF DESCRIPTION OF THE DRAWINGS

The foregoing, and other, objects, features and advantages of the present invention will be more readily understood upon reading the following detailed description in conjunction with the drawings in which:

FIG. 4(b) shows an exemplary protocol whereby the portable units associated with the deployable base station select a control channel;

DETAILED DESCRIPTION

In the following description, for purposes of explanation and not limitation, specific details are set forth in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 2:
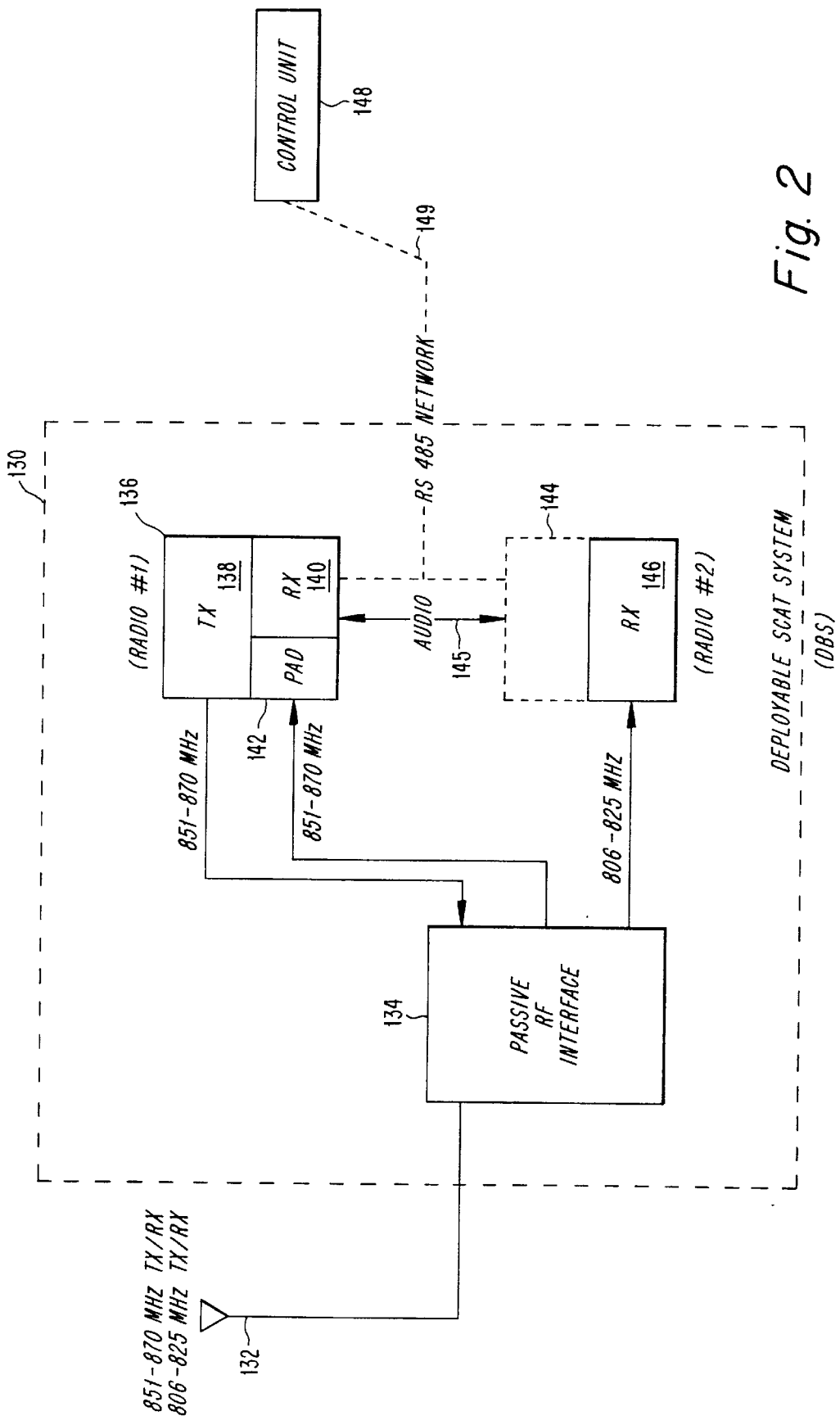
FIG. 2 shows an exemplary deployable trunked radio communication base station.

FIG. 2 is a schematic diagram of an exemplary deployable base station 130 according to the present invention. By way of overview, the base station includes an antenna 132 and associated passive RF interface 134 for communicating with one or more portable radios (not shown). The RF interface 134, in turn, is connected to a first and second radios, radios 136 and 144, respectively. Radio 136 includes a principal function of transmitting information to the portable radios via transmitting section 138. Radio 144 includes a principal function of receiving information from portable radios. An audio link 145 connects radio 136 and radio 144 so that the base station may route messages received through the receiving section 146 to portable radios via transmitting section 138. According to one embodiment, the radio link 145 provides both analog and digital audio communication to avoid unnecessary digital to analog and analog to digital conversions of audio speech data when messages are routed through the base station 130. Control is provided via a controller 148 in association with an interradio communication network 149. The control unit 148 may store a personality profile of the deployable base station (to be described later) and may coordinate trunked access to the deployable base station (to be described later).

Figure 1:
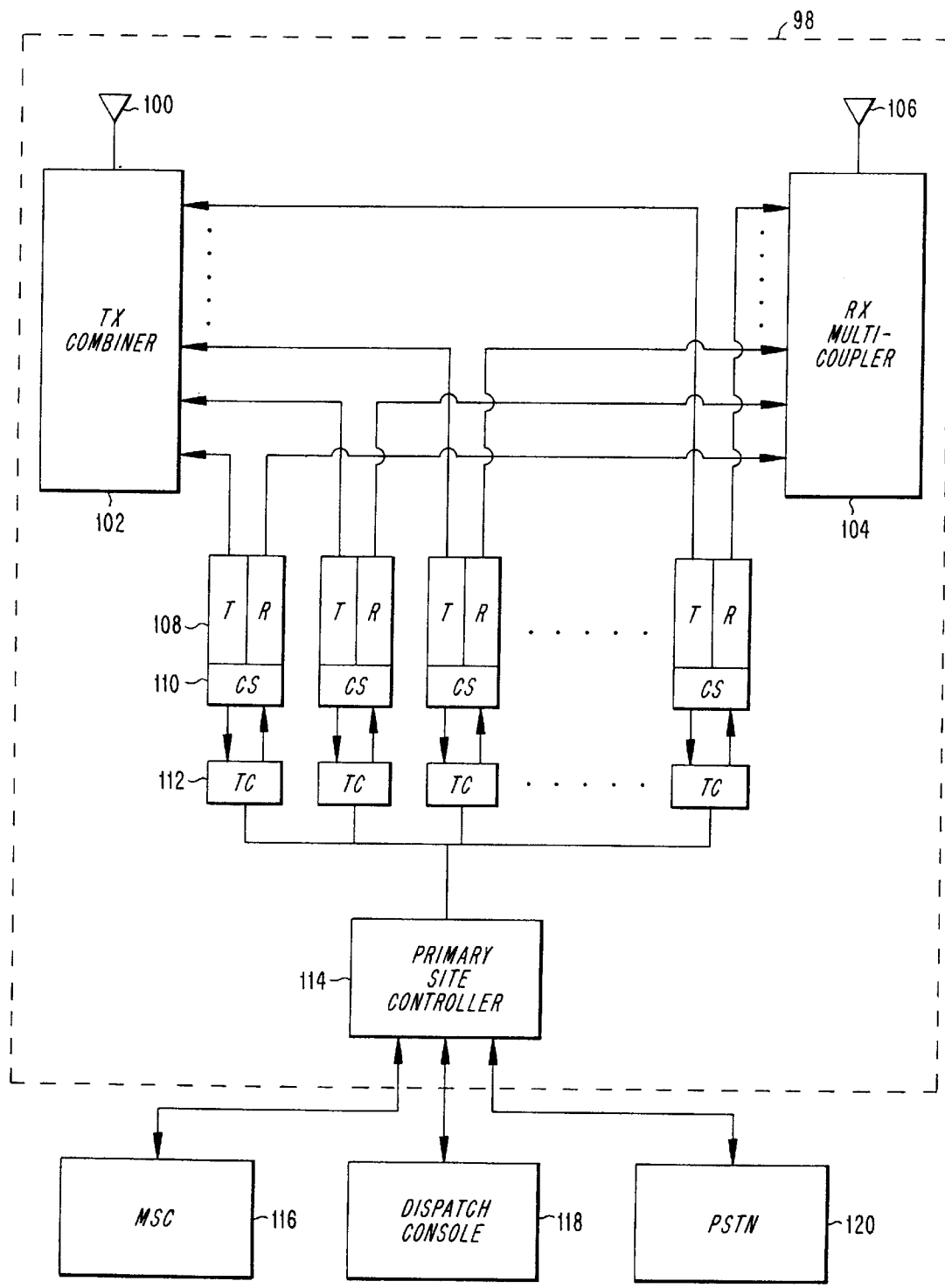
FIG. 1 shows an exemplary stationary trunked radio communication base station.

It is therefore seen that, unlike the traditional trunked base station shown in FIG. 1, the base station shown in FIG. 2 promotes mobility by employing only a single repeater module allocated to a single duplex channel. Moreover, further unlike the traditional trunked base station shown in FIG. 1, the single duplex channel is not fixed, but may assume any number of prescribed permissible channels. As will be discussed in detail later, a channel may be chosen to minimize interference with pre-existing stationary base stations, or other deployable base stations.

According to one exemplary embodiment, the deployable base station supports trunked service by using the protocol described more fully in commonly assigned U.S. Pat. No. 5,408,680 to Hattey et al., the disclosure of which is incorporated herein in its entirety. By way of summary, in this system, the single channel operates alternatively in a control channel mode and in an assigned channel mode, with the idle mode being the control channel mode. When the system is idle, control channel signalling is transmitted over the single channel. When a channel request is received, a channel assignment message is sent out in a standard manner via the control channel signalling and the single channel then begins operating as an assigned channel. At the conclusion of the assigned channel communication, the single channel reverts to the control channel mode in readiness for further channel assignments. This protocol is denoted in the '680 patent by the acronym "SCAT", which stands for Single Channel Autonomous Trunked system. For this reason, the deployable base station (or otherwise "DBS") is labeled in FIG. 2 as a "Deployable SCAT System". The SCAT protocol, being digitally trunked, supports many special features identified above, such as communication security through data encryption, and the ability to place individual-specific or group-specific calls. Interested readers should refer to commonly assigned U.S. Pat. No. 4,905,302 to Childress et al. for a more complete discussion of these features, said patent being incorporated herein in its entirety by reference.

Continuing with the discussion of the deployable base station in FIG. 2, the first radio 136 is shown as including a receiving section 140. The receiving section 140 includes a low power PA (power amplifier) and additional receiver attenuation incorporated within the section denoted schematically as PAD 142. This allows the deployable base station to sample the RF energy emanating from other base stations (either fixed or mobile). This information, in turn, allows the deployable base station to choose a control channel to communicate with portable stations without interfering with pre-existing nearby base stations (either fixed or mobile).

According to exemplary aspects of the present invention, this interference monitoring is desirable because the deployable base station operates in the same communication band allocated to a traditional fixed base station (e.g. as shown in FIG. 2, but not limited thereto, the frequencies 851–870 MHz TX/RX and 806–825 MHz TX/RX). It is especially advantageous to use the same communication band as the fixed base station as this enables the same portable units to be used for both the fixed and mobile stations without any modification to their hardware. Also, when the coverage provided by a deployable base station overlaps the coverage provided by a stationary base station, the use of the same communication band and compatible trunking protocol allows a portable to easily switch between the two systems.

Figure 3A:
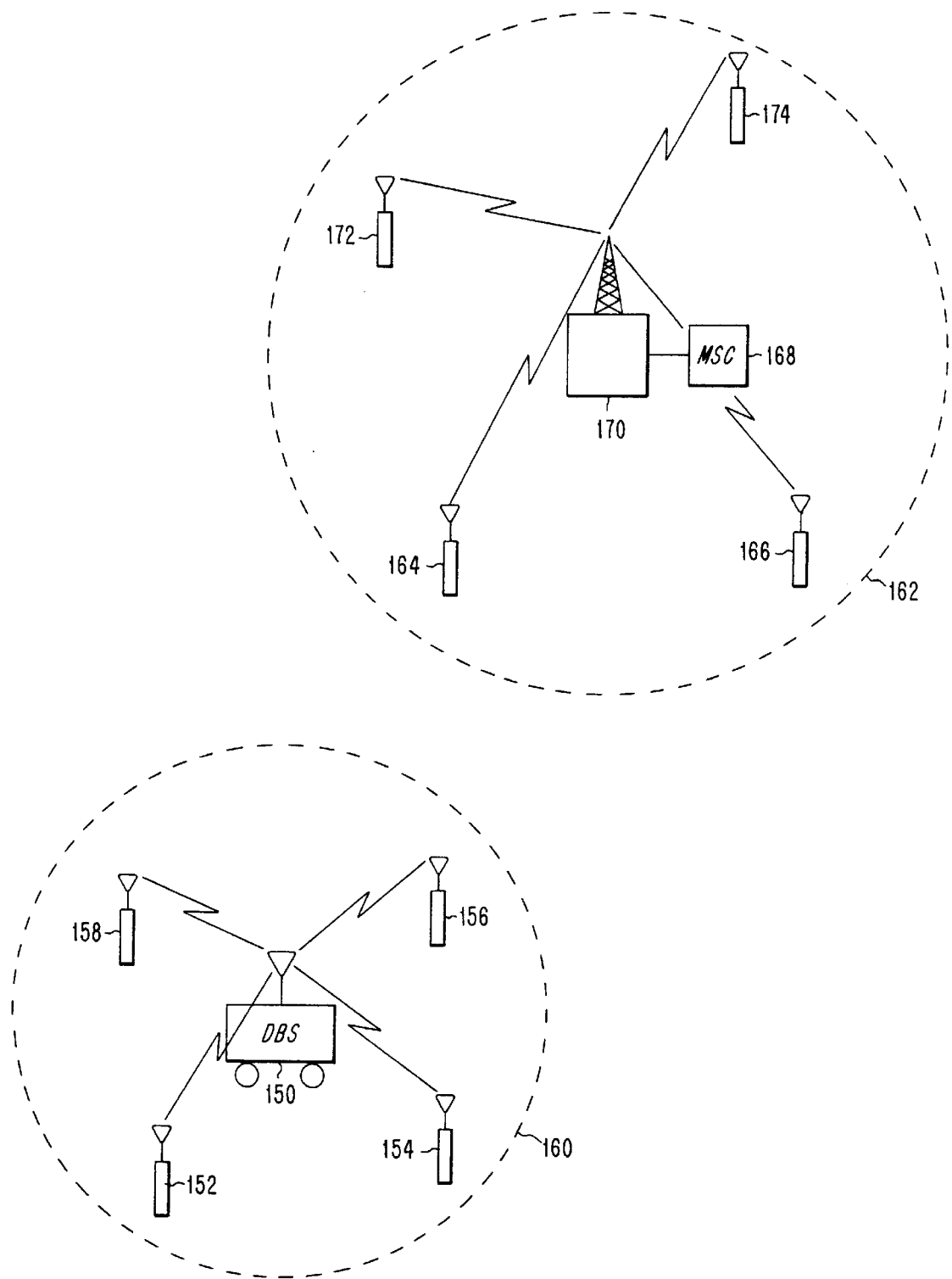
FIG. 3(a) shows an exemplary application of a deployable base station to provide trunked radio communication services outside the coverage of a pre-existing stationary base station.

The many beneficial applications of the present invention will become more apparent with reference to FIGS. 3(a) to 3(d). FIG. 3(a) shows one embodiment where the deployable base station (DBS) 150 is moved to a remote area to provide trunked radio communication service to users'portable radios 152, 154, 156 and 158. This embodiment is particularly useful in quickly providing trunked radio communication service to support disaster relief efforts in remote rural regions where no pre-existing trunked system existed before. Alternatively, the deployable base station in this embodiment may be used as a temporary replacement of a stationary base station which has been disabled due to a natural disaster or other catastrophic disruption of service.

As used herein, the term "portable radios" encompasses the radios communicating with the base station 150 in coverage area 160, including hand-held radios, mobile radios associated with vehicles, and various computer-based devices. Furthermore, the deployable base station is shown schematically as including wheels to emphasize that it may be easily transported. However, the base station may be transported to the scene of deployment by any suitable form of transportation. For instance, the base station may be housed on a helicopter or seaborne vessel if necessary. In any event, according to one embodiment, the deployable base station employs minimal hardware infrastructure, enabling it to operate using its associated vehicle's battery supply without modification thereto.

As shown in FIG. 3(a), the coverage 160 provided by the DBS 150 is separate and remote from the coverage 162 provided by a traditional stationary base station 170 (connected to multi-switching center 168 and servicing portable radios 164, 166, 172, and 174). As such, the deployable base station will likely not detect any interfering "foreign" RF energy, and will likely be able to communicate on any channel it chooses (or is chosen by a system operator therefor).

Figure 3B:
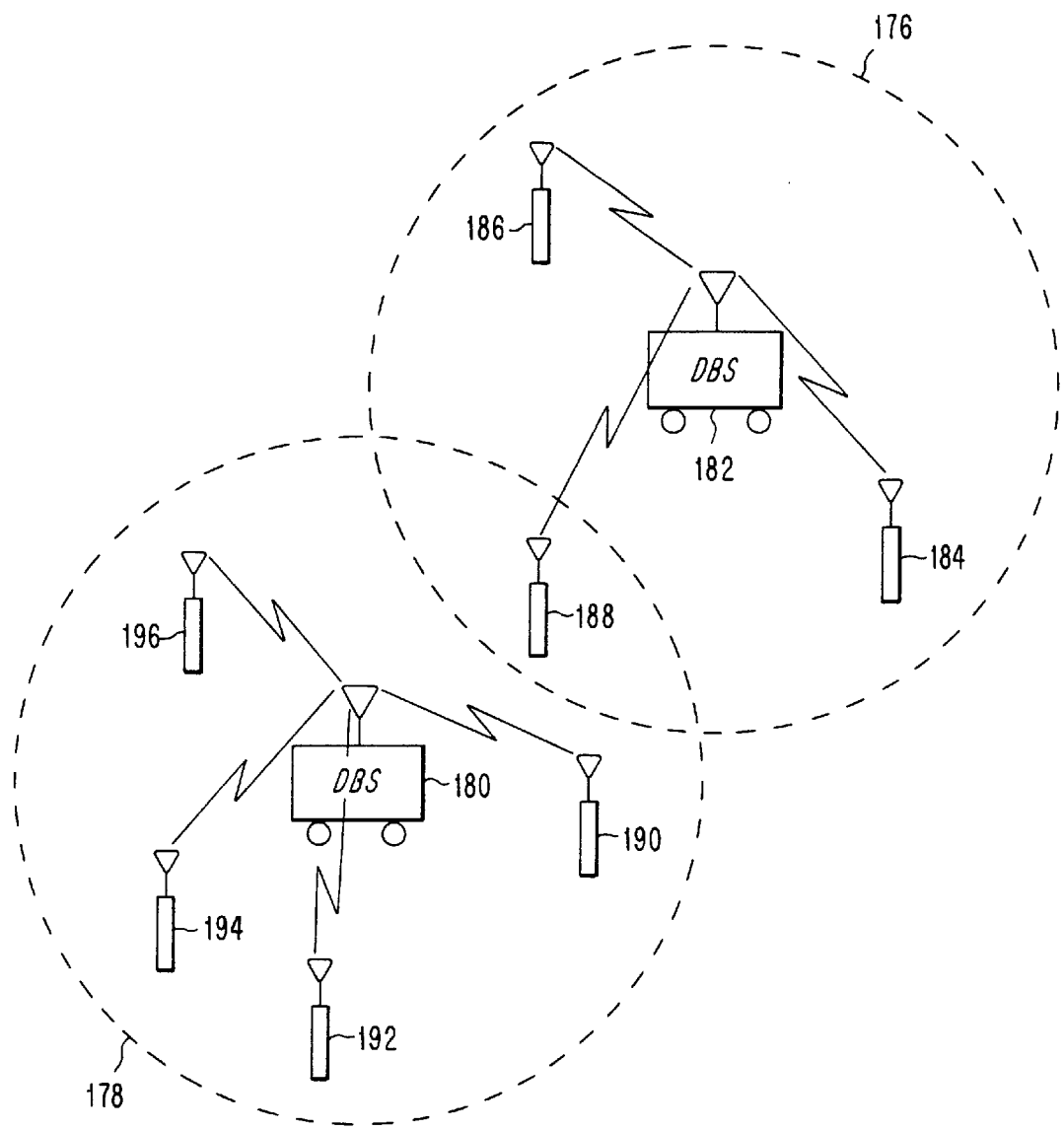
FIG. 3(b) shows an exemplary application of two deployable base stations to provide trunked radio communication services in close proximity to each other.

Interference is a potential concern, however, in the embodiment shown in FIG. 3(b). As shown there, a first DBS station 180 is initially called to a remote area to provide short-term trunked radio communication service to a number of individuals using radios 190, 192, 194 and 196 within coverage area 178. Thereafter, to provide additional support, a second DBS station 182 is called to the same scene to expand the service to a larger number of individuals, including individuals using radios 184, 186 and 188 in coverage area denoted by dashed circle 176. The radio coverage associated with DBS 180 overlaps the coverage 176 provided by DBS 182, thus presenting potential interference concerns.

To reduce the possibility of interfering systems, the late arriving DBS station 176 is forced to monitor prevailing RF energy in the vicinity via its receiving section 140 (in reference to FIG. 2) before becoming active. The DBS station 182 will be precluded from selecting a control channel which another base station (e.g. DBS 180) is currently locked onto. If there are no available control channels for the newly arriving DBS station 182, it will be forced to remain inactive.

Figure 3C:
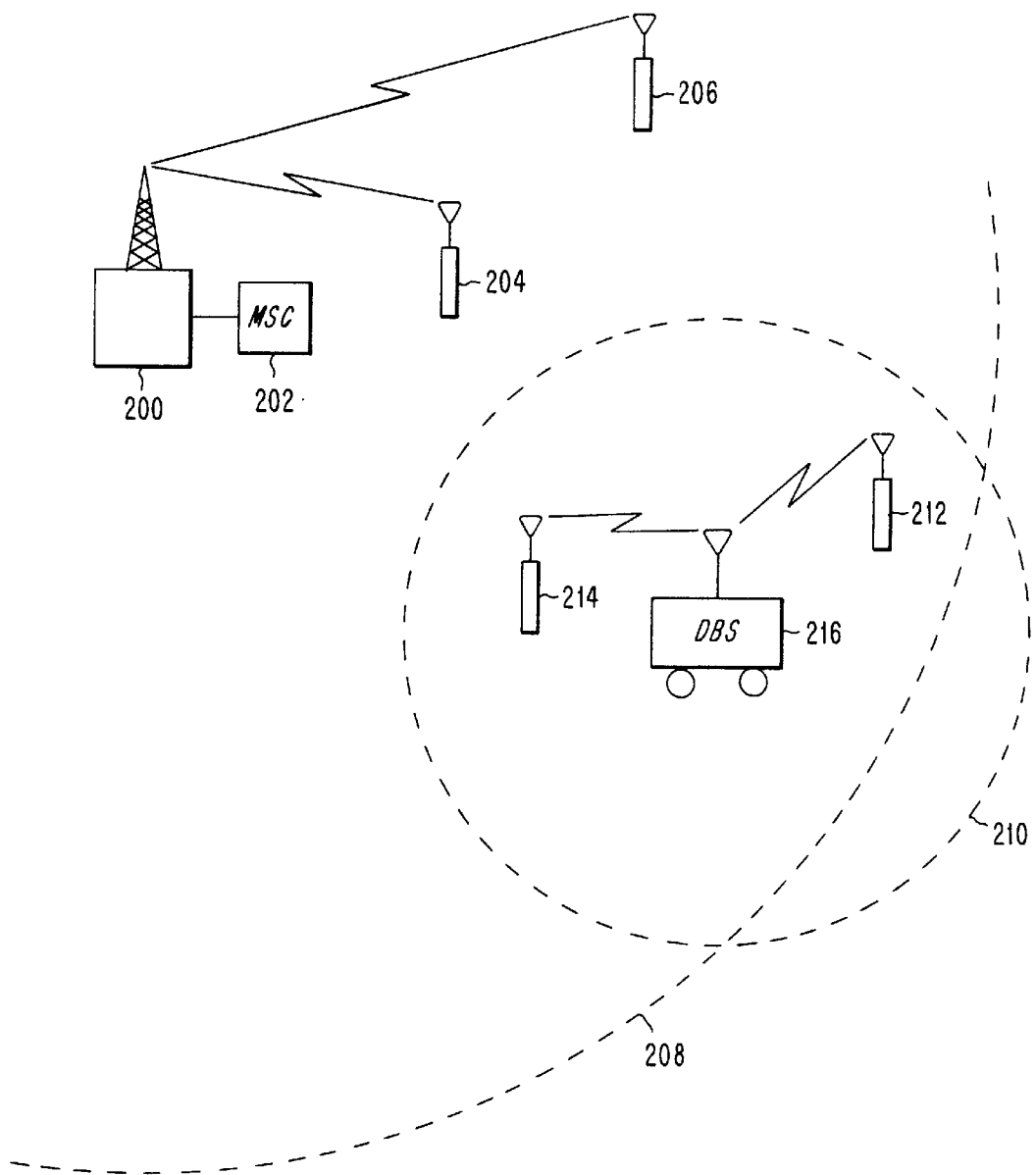
FIG. 3(c) shows an exemplary application of a deployable base station to supplement the trunked radio communication services provided by a pre-existing stationary base station.

The same interference concerns are raised in the context of the embodiment shown in FIG. 3(c), where a DBS station 216 defines a coverage area 210 which is either partially or wholly overlapped by the coverage 208 provided by a fixed base station 200 in association with MSC station 202 (serving portable radios 204 and 206). In this case, the newly arriving DBS station 216 will determine which control channels are being used by the fixed base station 200 and avoid those frequencies if possible. In one embodiment, the arriving DBS station will be pre-programmed to look for available control channels which are determined in advance to be least likely to carry RF traffic for pre-existing systems.

The embodiment shown in FIG. 3(c) offers a wide range of benefits. If base station 200 has become overloaded by progressively increasing RF traffic, a separate DBS station can be deployed to distribute the processing load. Alternatively, the DBS system can be deployed at the periphery of a fixed base station's coverage 208 to keep pace with the expanding bounds of a metropolitan area. Since the same radios can communicate with either the fixed base station 208 or the mobile base station 216, the upgrade is especially "seamless".

Figure 3D:
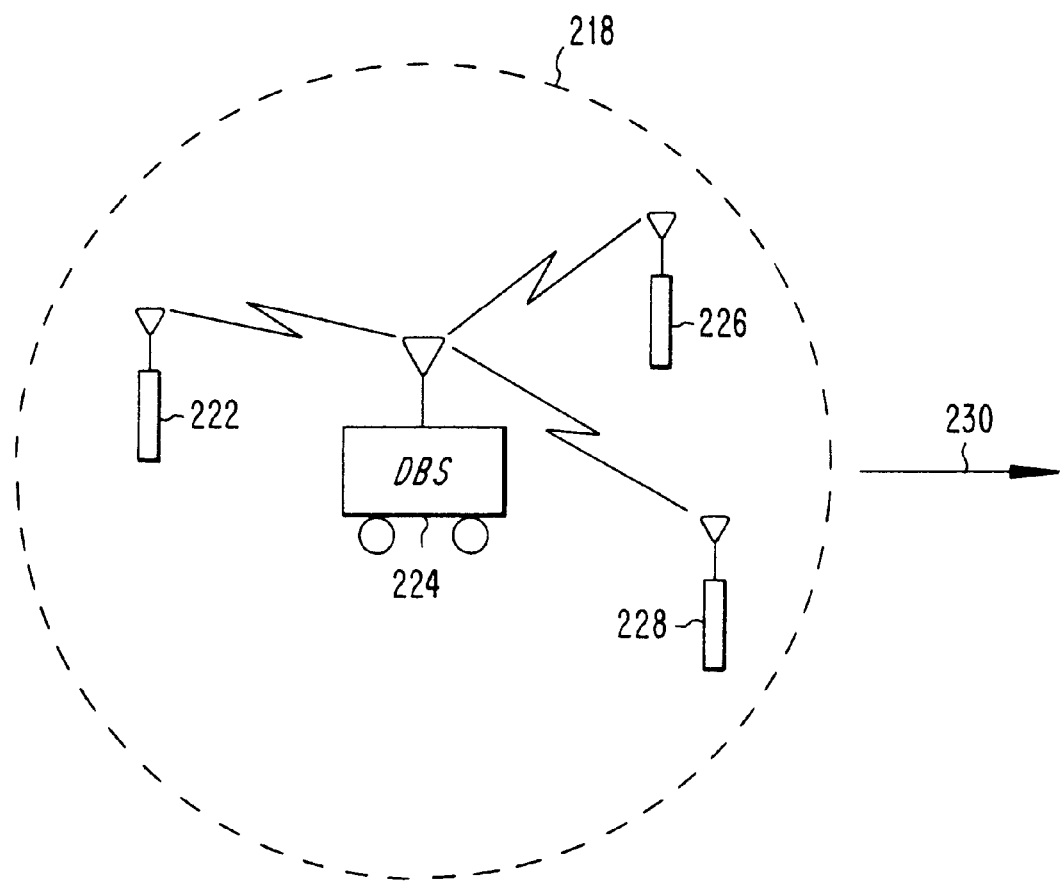
FIG. 3(d) shows an exemplary application of a deployable base station located on a moving vehicle to provide trunked radio communication services to satellite portable radios, which move with the base station.

Finally, since the deployable base station is mobile, it may provide service while it is being transported, as shown in FIG. 3(d). For instance, presidential or diplomatic motorcades typically require secure wireless communication. To this end, the deployable base station 224 could be located in a base station vehicle. The DBS 224 coordinates and trunks the communication between other members in the motorcade operating radios 222, 226 and 228, all moving in the same cluster enclosed within the coverage 218. The messaging may be encrypted to prevent eavesdroppers.

Having set forth the structural components of an exemplary deployable base station, and various applications thereof, the exemplary protocol used by the deployable base station in communicating with one or more portable radios will now be discussed in connection with FIGS. 4(a), 4(b), 5, 6 and 7.

Figure 4A:
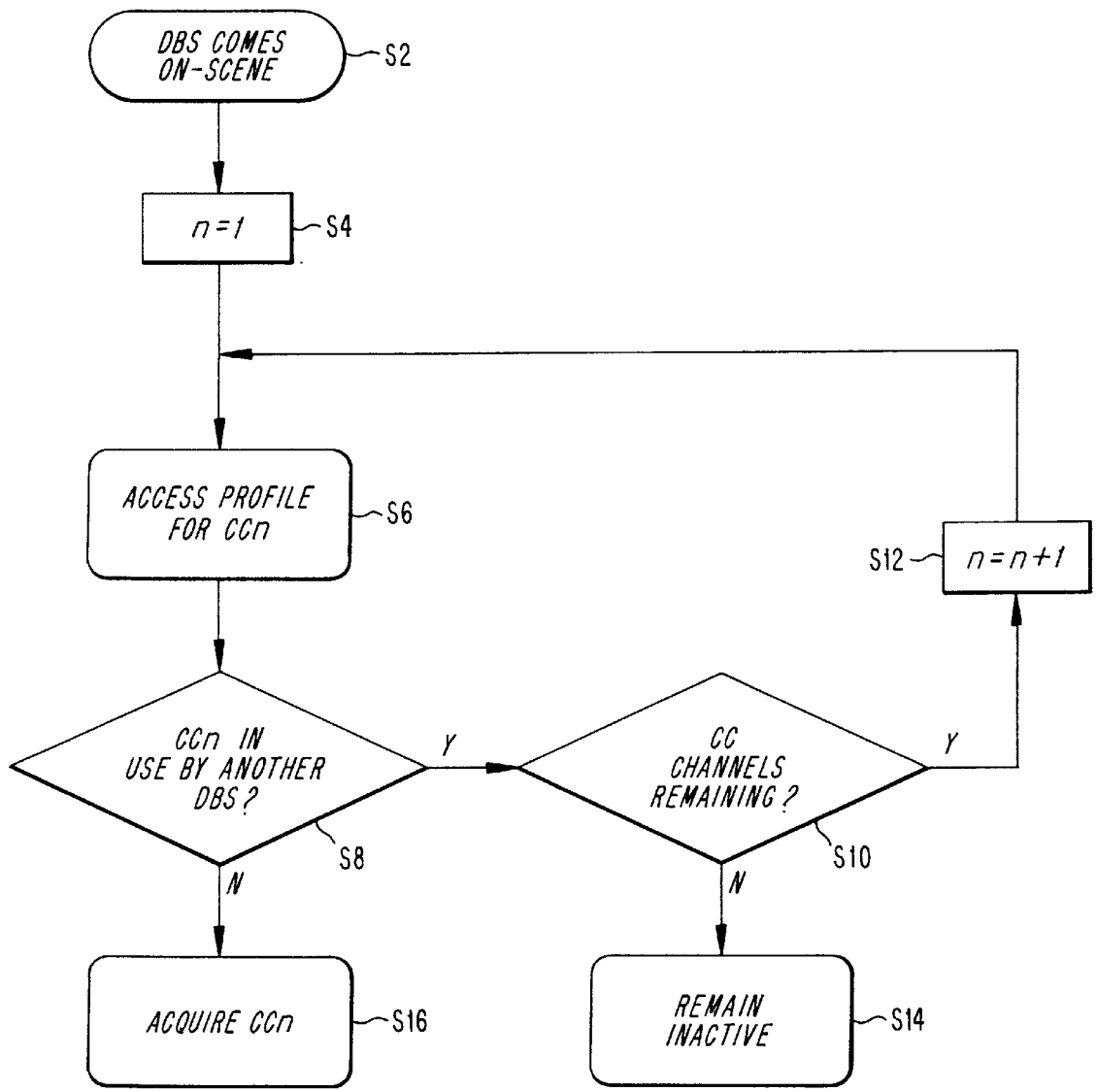
FIG. 4(a) shows an exemplary protocol whereby the deployable base station selects a control channel.

FIG. 4(a) illustrates an exemplary protocol whereby the DBS selects a control channel upon coming on-scene or powering up on-scene (step S2). By way of introduction, the DBS station contains a DBS profile resident in its memory (e.g. in control module 148 of FIG. 2). Among other information, the profile contains a list of channels which the DBS station should interrogate for availability upon coming on-scene. The list may rank the channels according to suitability, such that the most preferred channel is interrogated via receiving section 140 for availability first, and the least desirable last. Preferably, the list of channels is chosen to minimize potential interference with a pre-existing base station.

Thus, upon coming on line, the DBS station interrogates the first channel stored in its profile memory (steps S4 and S6) by sampling RF energy using receiving section 140. If the channel is available (as ascertained in step S8), the DBS station locks onto that channel (step S16). If the channel is not available, the DBS station will interrogate the availability of other channels listed in its personality profile (steps S10, S12 and S6). If all of the channels are busy, then the DBS is forced to remain inactive at this time (steps S10 and S14).

The portable radios contain a similar personality profile resident in their radios' memories (not shown). That profile also ranks a list of control channels which the portable unit should attempt to acquire upon powering up or coming on-scene (step S20 of FIG. 4(*b*)). According to exemplary embodiments, the list may rank control channels normally associated with stationary base stations first, followed by control channels associated with DBS stations. This would provide a portable radio (such as the radios 212 and 214 shown in FIG. 3(*c*) the opportunity to communicate with the fixed base station first, if possible. Alternatively, the system designer may allow the portable radio users to override this selection and tune to the DBS station 216 (again shown in FIG. 3(*c*)) in order to distribute the load away from a stationary fixed base station. In still another embodiment, the personality profile of the portable unit may also contain control channels associated with vehicular repeater stations, which also are designed to provide trunked digital radio communication service, as discussed more fully in copending and commonly assigned U.S. Application Ser. No. 08/649,745 (our reference 027545-333), filed on Aug. 9, 1996, now U.S. Pat. No. 5,857,144, issued Jan. 5, 1999, which is incorporated herein in its entirety.

FIG. 4(*b*) shows exemplary steps used by the portable radio in selecting a suitable control channel. In steps S22 through S26 the portable radio interrogates the availability of a preferred control channel associated with a fixed base station. If the first choice is not available, the portable radio will ascertain the availability of other control channels typically employed by the traditional fixed base station (steps S42, S24 and S26). If none of these channels are available, the portable unit will then attempt to lock onto the preferred control channel associated with a DBS base station (steps S28 through S34). If the first choice is not available, the portable radio will ascertain the availability of other control channels associated with DBS systems (steps S40, S32 and S34). If no control channel is available, the portable unit will be forced to remain idle (S38). Otherwise, the portable unit will lock onto the available control channel (S46).

Figure 5:
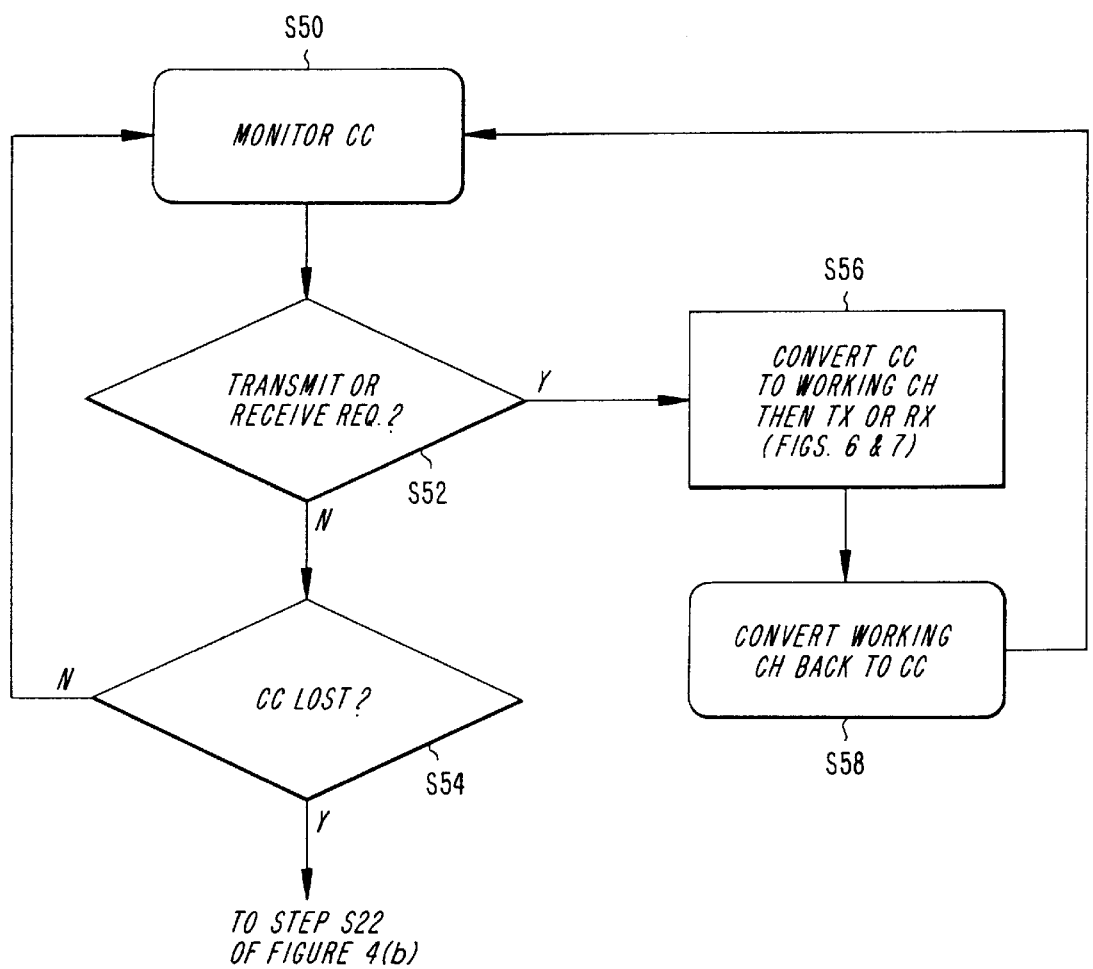
FIG. 5 shows an exemplary protocol whereby the portable units monitor the control channels selected as per the protocol shown in FIG. 4(b)

Once the portable unit has acquired a control channel in the manner described above, it begins monitoring the control channel for message activity (steps S50, S52 and S56 in FIG. 5). If the user of a portable radio presses a push-to-talk (PTT) button on the radio to transmit information, or the control channel contains an assignment message addressed to the portable radio, the control channel is converted into a working channel, and the message is transmitted or received (step S56), as will be discussed in more detail later in the context of FIGS. 6 and 7. Thereafter, the working channel reverts to a control channel (step S58) and the portable unit once again commences monitoring the control channel for message activity (step S50).

For various reasons, the portable radio may "lose" its control channel (step S54). For instance, a control channel may "deteriorate" because the user moves to a location which the control channel can not provide adequate service. The "deterioration" of the control channel may be gauged from a waning signal strength measure (e.g. RSSI) or the loss of sync on the control channel for a predetermined time period (e.g. five seconds), or the unavailability of a control channel for a prescribed amount of time due to an unusually long call by another portable radio. Alternatively, the control channel may have sufficient strength, yet the portable radio detects that another control channel would provide a superior control channel. A superior control channel might correspond to a stronger signal or a control channel having a higher ranking in the personality profile of the portable unit. If so, the communication system might allow the portable station to switch to that preferred channel.

By way of example, a police officer using the trunked radio communication system may begin his investigation in an open field in which his portable radio has sufficient power to reach the stationary base station (e.g. base station 200 in FIG. 3(*c*)). Accordingly, the portable unit will be locked directly onto the control channel of the base station 200. Thereafter, the officer may enter a building to question various individuals, where his portable radio is not successful in transmitting messages to the base site. This will prompt the portable radio to locate another control channel, which may correspond to a nearby DBS station (e.g. DBS 216 shown in FIG. 3(*c*)). However, when the officer leaves the building, the portable radio may once again communicate directly with the base station 200. The portable would accordingly switch back to the control channel corresponding to the base station 200.

If the control channel is "lost", the portable radio will commence scanning for another control channel. Preferably, as discussed in connection with FIG. 4(*b*), the portable radio will look for available stationary base sites first, followed by an available deployable base station in the area. If these sites are available, the portable may tune its control channel to these new sites and resume monitoring the new control channel for message activity (step S50).

Figure 6:
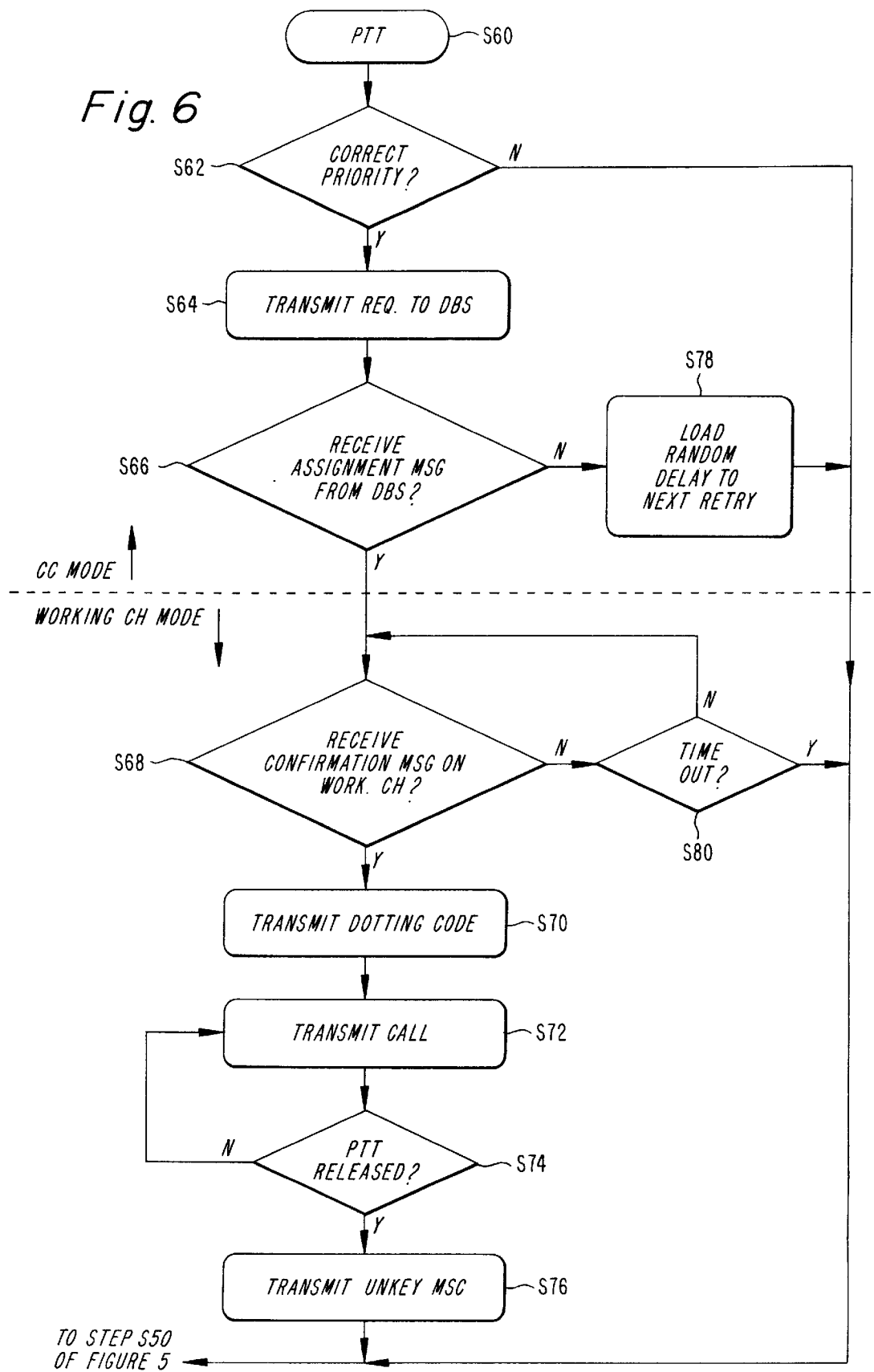
FIG. 6 shows an exemplary protocol whereby the portable units transmit data.
Figure 7:
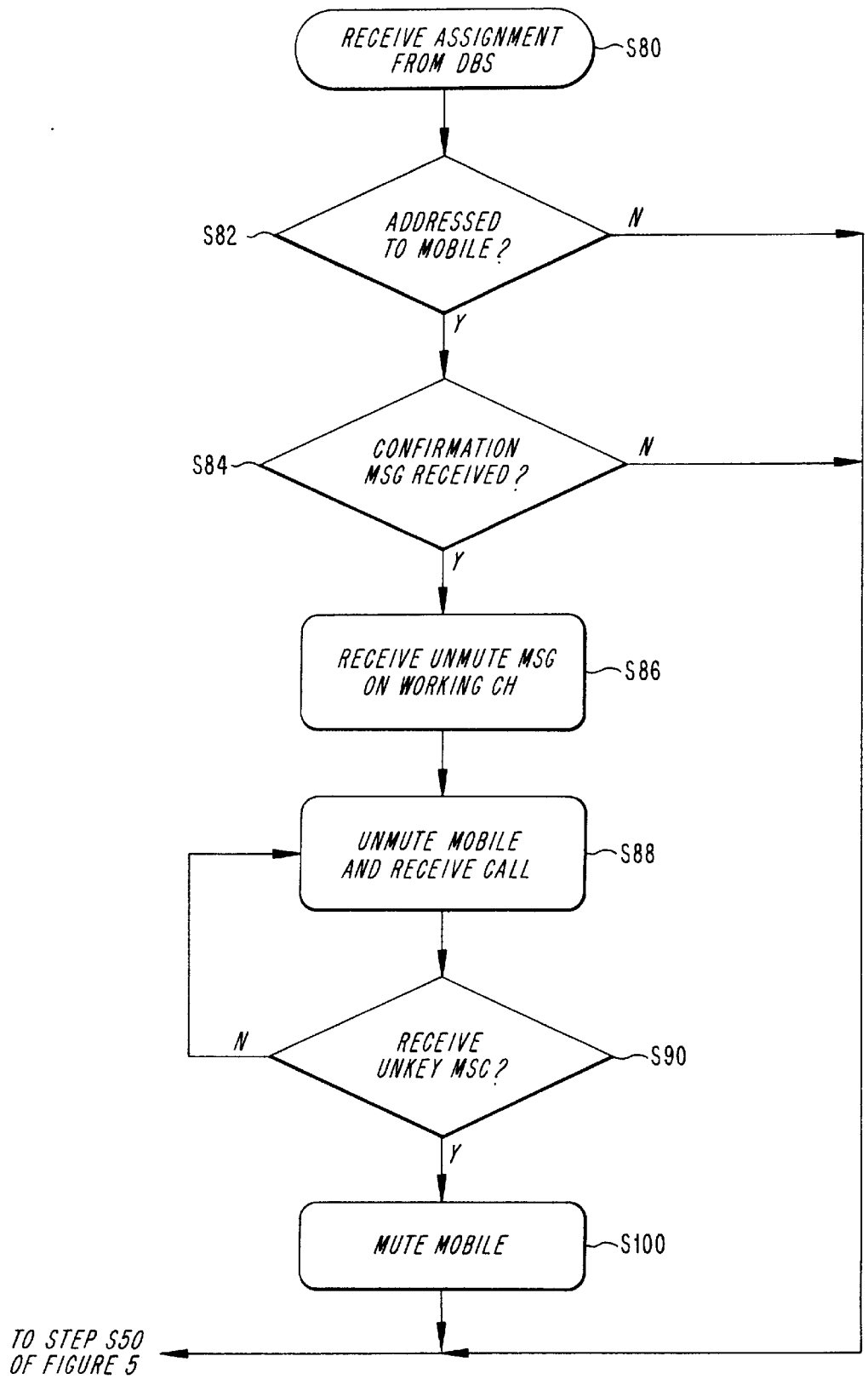
FIG. 7 shows an exemplary protocol whereby the portable units receive data.

FIG. 6 describes an exemplary protocol by which the portable radios of the present invention may transmit messages to a DBS base site, while FIG. 7 describes an exemplary protocol by which the portable radios may receive messages from the DBS base site.

As shown in FIG. 6, the sequence of steps by a which portable transmits messages to a DBS station commences in step S60 by the user pressing a "press-to-talk" button on his or her radio. If the user has been allocated priority to communicate at this time (step S62), the portable unit will transmit a request message on the control channel to the DBS station (step S64). Thereafter, the portable will monitor the control channel for a response from the base station (step S66). If a response is not received in a prescribed number of frames, the system will load a random delay which dictates when the portable station may again attempt access to the base station (step S78). If, on the other hand, an assignment is received from the base station (which is transmitted by the base station three times as a safeguard to ensure reception), the channel may now be conceptualized as a working channel. At this point, the portable waits to receive a synchronization word followed by a confirmation message from the base station. If this information is not received in a prescribed amount of time or number of frames (step S80), the portable unit will revert to the control mode and return to step S50 of FIG. 5. If, on the other hand, the confirmation message is received, the portable radio transmits dotting code (step S70) followed by its message (step S72). The portable will continue to transmit data or voice over the working channel until the PTT button is released (step S74). At this time, the portable radio will transmit an unkey message on the channel (step S76) and then return to step S50 were it monitors the control channel for further message activity.

FIG. 7 shows an exemplary protocol for receiving messages using the radio communication system according to the present invention. The portable unit continually monitors the control channel linking it to the base station (either DBS or stationary) (step S50 in FIG. 5). If a channel assignment is detected on the control channel (step S80 in FIG. 7), the portable ascertains whether the message is addressed to it (step S82). For instance, the message might be specifically addressed to the portable radio, as may be determined by comparing the radio's ID code (e.g. which may be stored in its personality profile) with the ID code of the message. Alternatively, the message might be addressed to a group to which the portable radio corresponds. According to one exemplary system, 11 bits are available to determine the address of a unit within an agency, fleet or subfleet. Twelve bits are available to determine the individual identity of a particular unit. In either the case of individual or group matched call, the portable radio unmutes its output (steps S86 and S88). When the communication is terminated (step S90), the radio is again muted (step S100) and the portable radio returns to monitoring the control channel.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A deployable base station for providing trunked radio communication service, comprising:
    a control module for selecting a channel on which to conduct radio communication with one or more radios;
    a first receiving module for receiving messages from at least one radio on said selected channel; and
    a transmitting module for transmitting messages to at least one radio on said selected channel;
    wherein said channel which is selected for radio communication comprises a dual-mode channel which serves as both a control channel and working communication channel;
    further comprising:
        a second receiving module for ascertaining whether a channel selected by said control module will interfere with one or more pre-existing radio communication sources operating in the vicinity of said deployable base station;
        wherein, in the event of said selected channel is determined to interfere, said control module selects another available channel.

2. A deployable base station according to claim 1, further including:

means for monitoring said selected channel, in a control mode of said channel, for message activity; and
    means for converting said selected channel from said control mode to a working mode when message activity is detected by said means for monitoring; and
    means for returning said selected channel to its control mode after a message is transmitted in said working mode.

3. A deployable base station according to claim 1, further comprising:
    a profile stored in said control module for listing a series of channels for potential use by said deployable base station in communicating with said one or more portable radios;
    wherein said control module selects a channel from said profile, and said second receiving means ascertains whether said channel selected from said profile interferes with one or more pre-existing radio communication sources operating in the vicinity of said deployable base station.

4. A deployable base station according to claim 1, further wherein said deployable base station is housed within a mobile carrier.

5. A deployable base station according to claim 4, wherein said deployable base station is operational while in said mobile carrier.

6. A deployable base station according to claim 5, wherein said deployable base station is operational while said mobile carrier is in motion.

7. A method for providing trunked radio communication services, comprising the steps of:
    transporting a deployable base station to a given geographic area where said radio communications services are desired;
    operating an interrogating receiving module of said deployable base station to ascertain the presence of one or more pre-existing radio sources at said given geographic area;
    selecting a communication channel which does not interfere with any pre-existing radio sources ascertained in said step of operating, wherein said channel which is selected for radio communication comprises a dual-mode channel which serves as both a control channel and working communication channel; and
    conducting communication, using a transmitting module and another receiving module, between one or more radios at said given geographic area using said selected communication channel which does not interfere with any pre-existing radio sources.

8. A method according to claim 7, wherein said step of operating includes the steps of:
    accessing a personality profile of said deployable base station, and selecting a channel from one or more channels listed thereat;
    operating said interrogating receiving module to ascertain whether said selected channel from said profile will interfere with a preexisting radio source at said geographic area;
    choosing another channel listed in said profile in the event that said interrogating receiving section determines that said channel selected in said step of accessing will interfere with a preexisting radio source at said geographic area.

9. A method according to claim 7, wherein said step of conducting communication includes the steps of:

monitoring said selected channel, in a control mode of said channel, for message activity;

if the event activity is detected in said step of monitoring, converting said selected channel from said control mode to a working mode;

communicating a message on said selected channel in said working mode; and returning said selected channel to its control mode.

10. A method according to claim 7, wherein said step of transporting comprises transporting said deployable base station on a mobile carrier.

11. A method according to claim 10, wherein said given geographic area at which radio communication is desired is an area defined in reference to a location of said mobile carrier.

12. A method according to claim 11, wherein said steps of operating, selecting and conducting are performed while said mobile carrier, carrying said deployable base station, is in motion.

13. A method for providing trunked radio communication services, comprising the steps of:

activating a radio within a coverage area of at least one of: a fixed base station and a deployable base station;

interrogating, by the radio, the availability of a control channel associated with said fixed base station;

if said control channel associated with said fixed station is available, then acquiring said control channel associated with said fixed station;

if said control channel associated with said fixed station is unavailable, then interrogating the availability of a control channel associated with said deployable base station; and if said control channel associated with said deployable base station is available, then acquiring said control channel associated with said deployable station.

* * * * *